United States Patent [19]
Koch

[11] Patent Number: 6,052,363
[45] Date of Patent: Apr. 18, 2000

[54] METHOD FOR CAUSAL ORDERING IN A DISTRIBUTED NETWORK

[75] Inventor: Ruppert Rolf Koch, Dallas, Tex.

[73] Assignee: Northern Telecom Limited, Montreal, Canada

[21] Appl. No.: 08/940,412

[22] Filed: Sep. 30, 1997

[51] Int. Cl.[7] .............................. G01R 31/08; H04J 3/06; H04L 7/00

[52] U.S. Cl. .......................... 370/252; 370/507; 375/356

[58] Field of Search .................................. 370/252, 507, 370/508, 509, 519, 394, 350, 410, 231, 253; 375/356

[56] References Cited

U.S. PATENT DOCUMENTS

| | | | |
|---|---|---|---|
| 5,602,992 | 2/1997 | Danneels | 370/507 |
| 5,777,988 | 7/1998 | Cisneros | 370/252 |
| 5,796,719 | 8/1998 | Peris et al. | 370/231 |
| 5,926,461 | 7/1999 | Habermann et al. | 370/253 |
| 5,933,414 | 8/1999 | Georgiadis et al. | 370/252 |

FOREIGN PATENT DOCUMENTS

| | | |
|---|---|---|
| 0722233 | 7/1996 | European Pat. Off. . |
| 2265280 | 9/1993 | United Kingdom . |

OTHER PUBLICATIONS

Baldoni, Roberto et al., "Causal Delivery of Messages with Real–time Data in Unreliable Networks," (1996).

Birman, Kenneth P. et al., "Reliable Communication in the Presence of Failures," (Feb. 1987).

*Primary Examiner*—Ricky Ngo
*Assistant Examiner*—Brenda H. Pham
*Attorney, Agent, or Firm*—Haynes & Boone, L.L.P.

[57] ABSTRACT

A system and method for causal ordering in a distributed network with a minimum amount of delay. In a distributed network having three interconnected nodes, each having synchronized clocks, the second node sends a message to the first node. Before it sends the message, however, the second node attaches a time stamp t2 to the message. To determine when the first node can provide a causally ordered response, the method first determines a minimum message latency f from the third node to the second node. The method then adds the value of the time stamp t2 to the message latency f to calculate a minimum response time t1. On or after the time t1, the first node can provide the causally ordered response.

15 Claims, 2 Drawing Sheets

METHOD FOR CAUSAL ORDERING IN A DISTRIBUTED NETWORK

TECHNICAL FIELD

This invention relates generally to distributed networks, and in particular, to a system and method for causal ordering in a distributed network with a minimum amount of delay.

BACKGROUND OF THE INVENTION

Distributed networks are continually becoming larger in their coverage area and faster in their message delivery. However, the tendency of distributed systems to cover large areas naturally reduces the speed of message delivery, i.e., increases message latency. Part of this speed reduction is a result of physical limitations, e.g., messages cannot travel faster than the speed of light and therefore message latency inherently increases with distance. However, message latency is further increased due to the overhead of a causally ordered network. Causal ordering is a property that guarantees a certain order of message delivery. If a node receives a first message, it may respond to it by sending out a second message. Any node in a causal ordered network that receives both messages will receive the first message before it receives the second message.

In a causally ordered network, when a node receives a message, before the node can respond to the message it must be certain that it will not receive any other message from any other node that causally proceeds that message. Therefore, the node must utilize some type of ordering scheme to signify when it can respond. One common scheme attaches a marker to a message for indicating the causal ordering of the message. However, this scheme is not desirable due to the bandwidth overhead required by the markers and the difficulty in implementation. Another scheme uses the creation time of the message to impose causal order by attaching time stamps to the message. This scheme works well because the time stamps consume very little bandwidth. However, the use of time-stamps do incur additional message delay. For example, when a node N receives a time-stamped message m, it must wait until it receives a message from every other node in the network with a time stamp equal to or greater than the one of message m. In this way, node N is certain that a causally ordered response to the message m does not depend on another message on its way to the node N but not yet received. Once the node N has received messages from all the remaining nodes with time-stamps greater than or equal to the time-stamp of the message m, causal ordering is thereby assured.

The delay in waiting for messages from the remaining nodes can be extensive. For example, in a network spanning the United States, a delay between the farthest-most nodes, even using optical fibers, is often greater than 25 milliseconds (ms). As a result, the causal response to every message, even those that are received in less than 25 ms, must be delayed for at least 25 ms.

This problem is exacerbated by the discrepancy of clock readings from node to node. Typically each node has either a logical clock or a physical clock. Although logical clocks, such as Lamport clocks, are easy to maintain and do not suffer from significant skew or drift, they do not allow the network to exploit knowledge about minimum message delay used by each node. Furthermore, independent physical clocks, such as a separate clock in each node, experience a significant amount of skew and drift between the different nodes. Even by applying sophisticated synchronization algorithms, the difference in the physical clock readings from node to node often cause a significant increase to message latency.

Therefore, what is needed is a system and method that allows a node to respond as quickly as possible to a received message, while still being assured that the response is causally ordered.

SUMMARY OF THE INVENTION

The foregoing problems are solved and a technical advance is achieved by a system and method for causal ordering in a distributed network with a minimum amount of delay. For example, in a distributed network having three interconnected nodes, each having its own clock, the second node sends a message to the first node. Before it sends the message, however, the second node attaches a time stamp t2 to the message. To determine when the first node can provide a causally ordered response, the method adds a minimum message latency f,3,2 from the third node to the second node to a time stamp t3 attached to a message from the third node. After the first node receives the message from the third node with a time stamp t3 such that $t3 \geq t2-f3,2$, the first node can provide the causally ordered response to the message from the second node.

In another embodiment, the network has a fourth node and the method must also account for messages from that node. The method adds the minimum message latency f3,2 to time stamps attached to messages from the third node to the first node and adds a minimum message latency f4,2 to time stamps attached to messages from the forth node to the first node in a manner as described above. As a result, the first node can provide a causally ordered response to the message from the second node after it receives the message from the third node with a time stamp t3 such that $t3 \geq t2-f3,2$ and receives the message from the forth node with a time stamp t4 such that $t4 \geq t2-f4,2$.

In another embodiment, the clocks for each of the nodes are synchronized by a global clocking system, such as a system of global positioning satellites. In this way, the skew and drift between the different clocks is negligible, such as an order of magnitude less than the largest of all minimum message latencies between any two nodes in the network.

In many instances, the addition of the corresponding minimum message latency allows a node to provide a causal ordered response immediately after receiving the message from the second node. In the remaining instances, the amount of time the first node must wait before it can respond is significantly reduced.

BRIEF DESCRIPTION OF THE DRAWINGS

FIG. 1b is a block diagram of one node of the distributed network of FIG. 1a.

DESCRIPTION OF THE PREFERRED EMBODIMENT

Figure 1A:
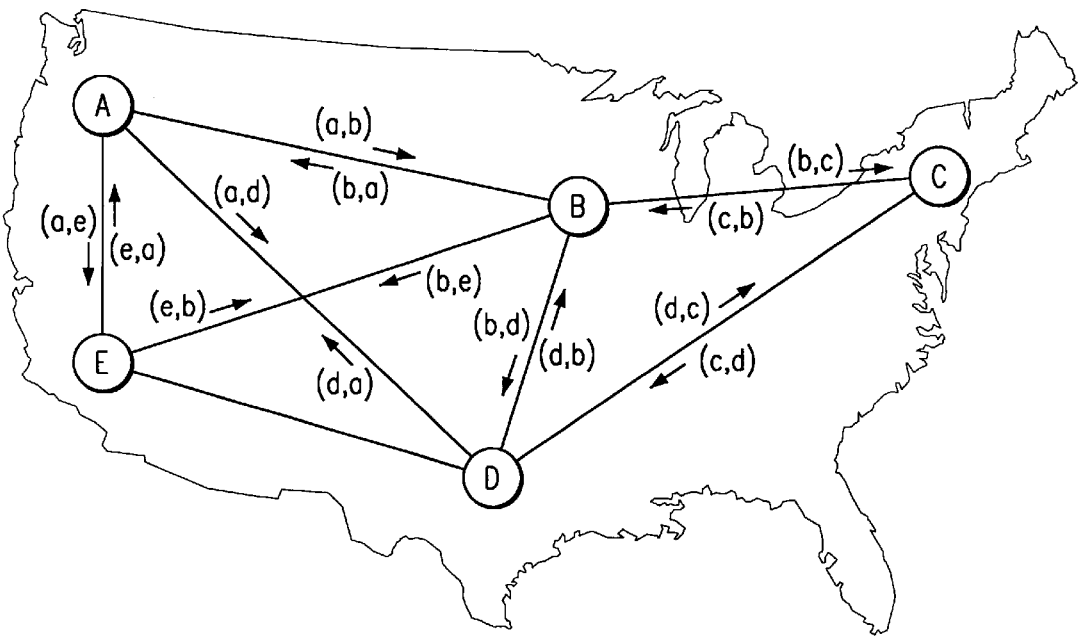
FIG. 1a is a directed, weighted graph for illustrating an exemplary distributed network embodying features of the present invention.

Referring to FIG. 1a, the reference numeral 10 designates a simplified network having nodes distributed throughout the United States. For the sake of example, the distributed network 10 includes five nodes A, B, C, D, and E. Each node includes several first-in first-out (FIFO) channels that support their interconnection. The channels are represented by directed paths (i,j), where the first index i refers to the node sending a message and the second index j refers to the node receiving the message. The messages are designated by the node that sent them and include a time stamp from that node. Furthermore, each node includes a local clock, each clock being closely synchronized by a global clocking system, such as one that utilizes signals from a global positioning satellite (GPS) system.

Figure 1B:
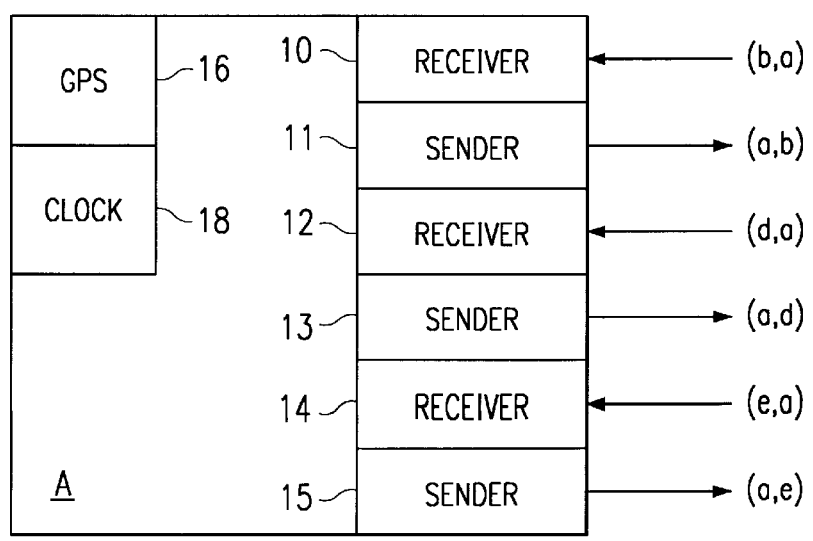

Referring also to FIG. 1b, for example, the node A includes receivers 10, 12 and 14 and senders 11, 13 and 15. The receiver 10 is connected to directed path (b,a) and the sender 11 is connected to directed path (a,b). Likewise, receivers 12, 14 and senders 13, 15 are connected to directed paths (d,a), (e,a) and (a,d), (a,e), respectively. The node A uses the sender 10 and directed path (a,b) for sending a message a, having a time stamp $t_a$, to node B. In such a manner, each of the nodes A–E are interconnected with paths, with the exception that no direct path exists between nodes A and C and nodes E and C. The node A also includes a GPS receiver 16 and a clock 18. The GPS receiver 16 receives signals from a satellite system (not shown) and converts these signals into an incremental sequence of time units measured in milliseconds (ms), e.g., 10 ms, 11 ms, 12 ms, . . . for use by the clock 18. As a result, the time stamp $t_a$ is accurately synchronized with the clock of node B. Furthermore, it is understood that the relative accuracy of GPS-based technology is likely to improve, thereby providing even less clock skew between the nodes A–E.

Assuming for the moment that the clock skew between the nodes A–E is negligible, when a node receives a message, the local time of the receiving node equals or exceeds the tagged time plus a delay associated with the path, or message latency. Continuing with the example above, if node A sends the message a to node B at a time $t_a=70$ ms, and the path (a,b) has a latency of 5 ms, then node B receives the message a on or after a time 75 ms. Conventionally, node B cannot provide a causally ordered response until it has received messages c, d, and e, each with a time-stamp greater than or equal to 70 ms. Therefore, using conventional procedures, the response must at least be delayed for the longest message latency of paths (c,b), (d,b), and (e,b). Once the messages c, d, and e (each having a time-stamp greater than or equal to 70 ms) are received, node B is assured that there is no additional message coming from any node that could causally affect message a. As will be discussed in greater detail below, by utilizing features of the present invention, node B can actually respond much sooner.

In general, the message latency for each of the paths of the distributed network 10 can be represented in a distance matrix F such that:

$$F=(f_{i,j})_{N\times N},\quad(1)$$

where $f_{i,j}$ is the latency for path (i,j) and N denotes the number of nodes in the network. Each path is assigned a minimum message latency and if two nodes are not connected, such as nodes A and C of the network 10, then a latency of $+\infty$ is assigned thereto. The matrix F can also describe completely connected networks $f_{i,j}<+\infty$), symmetric networks ($f_{i,j}=f_{j,i}$), and causal networks that do not allow negative weighted edges ($f_{i,j}\geq 0$).

Given the matrix F, it is possible to construct a shortest message latency matrix P where:

$$P=(p_{i,j})_{N\times N}\quad(2)$$

by computing the shortest path from a node i to a node j. For entries between non-connected nodes, such as between nodes A and C, the shortest path equals the shortest combination of message latencies from existing paths that can deliver a message between the two nodes. Therefore, all values of P are smaller than $+\infty$ (there exists at least one path between any two nodes) and greater than $-\infty$ (no loops exist with a total weight less than zero). However, the values $p_{i,j}$ do not consider time offset and clock skew, discussed in greater detail, below.

For the sake of general reference, let a node R be the receiver of a message s sent by a node S and tagged with a time-stamp $t_s$. Furthermore, let a node H represents any third node of the network. If the clocks at nodes R and S are synchronous, node R is assured that no message h from the node H can causally precedes the message s if the message h was sent at a time $t_h>t_s-p_{H,S}$.

The value $p_{H,S}$ can be used as an offset which is added to the time-stamp $t_h$ of incoming messages to derive a causal time-stamp $t_h^*$, with respect to each node H where $t_h^*=t_h+o_{H,S}$ and with the offset matrix O defined:

$$O=P\quad(3)$$

Therefore, as soon as all causal time-stamps $t_h^*$, are equal to or greater than $t_s$, the node R is assured a causally ordered response to the message s. For all instances in which the shortest message latency between two nodes is positive, the causal time-stamp $t_h^*$, is greater than the actual time-stamp $t_h$—which means that the requirement that each causal time-stamp $t_h^*\geq t_s$ is met before $t_h\geq t_s$.

To evaluate the effectiveness of the above procedure, assume that the times assigned to the links are exact times, i.e., a message traveling from node S to node R is "on the fly" for exactly $f_{S,R}$ time units. If every node sends out a message to every other node at least every r time units, node R receives a message h from node H with $t_h\geq t_s-p_{H,S}$ at a time $t_{h,recv}$, such that:

$$t_{h,recv}\leq t_s-p_{H,S}+f_{H,R}+\tau\quad(4)$$

However, message s will be on the fly for $f_{S,R}$ time units and node R will receive message s at time $t_{s,recv}=t_s+f_{S,R}$. Consequently:

$$t_{h,recv}\leq t_{s,recv}-p_{H,S}-f_{S,R}+f_{H,R}+\tau\quad(5)$$

For real networks, the argument $(-p_{H,S}-f_{S,R}+f_{H,R})$ adds up to a number less than or equal to zero because the message latency from node H to node R over node S is larger than the message latency directly between nodes H and R: $p_{H,S}+f_{S,R}\geq f_{H,R}$ As a result, node R does not need to wait longer than $\tau$ units after receiving message s. Since node H can be any node in the network, s can be delivered in causal order at a time $t_{s,deliver}$ such that:

$$t_{s,deliver}=\max(t_{s,recv},t_{h,recv})\leq\max(t_{s,recv},t_{s,recv}+\max(-p_{T,S}-f_{S,R}+f_{H,R})+\tau)\quad(6)$$

Strictly speaking, a network based on physical clocks cannot be implemented without any clock skew. However, the clocks in each node A–E are based on GPS technology and therefore have very little skew, e.g., an order of magnitude less than the message latency. The skew between the clocks on any two nodes can be illustrated in a matrix G. The elements $g_{i,j}$ are positive numbers which define an interval size. At any given point in time, the absolute value of the difference of node i's and node j's clock must not be greater than $g_{i,j}$. A symmetric matrix G ($g_{i,j}=g_{j,i}$) is a direct result of this definition.

Dealing with clock skew, equation (3) has to be modified as follows: After receiving the message s from the node S with time-stamp $t_s$, the node R can guarantee causal delivery after having received each message h from each of the nodes H with time-stamps $t_h \geq t_s - p_{H,S} + g_{H,S}$. Therefore, the offset matrix O can be redefined as:

$$o_{H,S} + p_{H,S} - g_{H,S} \quad (3')$$

which can be added to all time-stamps $t_h$: $t_h^* = t_h + o_{H,S}$. As discussed above, the message s from node S can be delivered as soon as the receiver receives messages h from all other nodes H with $t_h^* \geq t_s$.

Similar to the case without clock skew, by assuming that channel latencies are exact, the node R can receive message s during a time $t_{s,recv}$ such that:

$$t_s + f_{S,R} - g_{S,R} \leq t_{s,recv} \leq t_s + f_{S,R} + g_{S,R}. \quad (7)$$

Furthermore, the node R can receive message h during a time t such that:

$$t_s - o_{H,S} + f_{H,R} - g_{H,R} \leq t^{h,recv} \leq t_s - o_{H,S} + f_{H,R} + g_{H,R} + \tau \quad (8)$$

The combination of the left half of equation (7) and the right half of equation (8) results in the expression:

$$t_{h,recv} \leq t_{s,recv} - p_{H,S} - f_{S,R} + f_{H,R} + g_{H,R} + g_{H,S} + g_{S,R} + \tau \quad (9)$$

Again, for real networks the term "$-p_{H,S} - f_{S,R} + f_{H,R}$" is less than or equal to zero. Therefore, the delay for delivering the message s is in the range of the clock skew or the time $\tau$, whichever is larger. Equation 10 gives an upper limit for when the time message s can be delivered in causal order.

$$t_{s,deliver} = \max(t_{s,recv}, t_{h,recv}) \leq \max(t_{s,recv}, t_{s,recv} + \max(-p_{H,S} - f_{S,R} + f_{H,R}) + g_{H,R} + g_{H,S} + g_{S,R} + \tau \quad (10)$$

Figure 2:
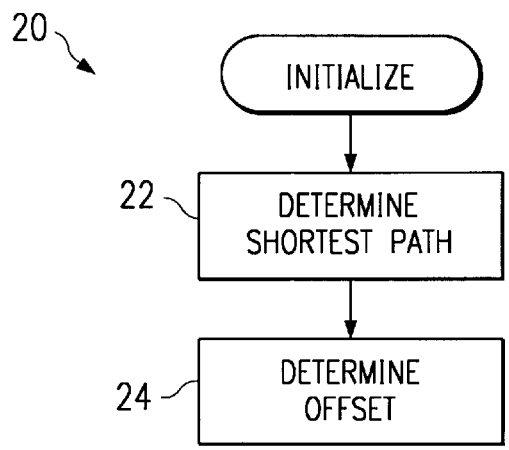
FIG. 2 is a flowchart illustrating a routine initially run by the nodes of FIG. 1.

Referring also to FIG. 2, the distributed network 10 is first initialized using a method 20. For the sake of example, representative channel latencies for the distributed network 10 are listed below in matrix F of Table 1 and the clock skew between the nodes is listed below in matrix G of Table 2. Furthermore, $\tau$ equals zero and a maximum clock skew of 1 ms exists for each node of the network 10, i.e., the slowest and the fastest clock do not differ by more than 1 ms.

TABLE 1

Channel latency matrix F

| Sender | Receiver | | | | |
|---|---|---|---|---|---|
| | A | B | C | D | E |
| A | 0 | 16 | +∞ | 20 | 12 |
| B | 15 | 0 | 8 | 8 | 18 |
| C | +∞ | 8 | 0 | 10 | +∞ |
| D | 22 | 9 | 11 | 0 | 10 |
| E | 12 | 18 | +∞ | 13 | 0 |

TABLE 2

Clock skew matrix G

| Sender | Receiver | | | | |
|---|---|---|---|---|---|
| | A | B | C | D | E |
| A | 0 | 1 | 1 | 1 | 1 |
| B | 1 | 0 | 1 | 1 | 1 |
| C | 1 | 1 | 0 | 1 | 1 |
| D | 1 | 1 | 1 | 0 | 1 |
| E | 1 | 1 | 1 | 1 | 0 |

At step 22, the shortest message latency between any two nodes is computed. In the present example, a matrix P of Table 3 is computed using the matrix F of Table 1. For entries between non-connected nodes, such as between nodes A and C, the shortest message latency equals the shortest combination of message latencies using existing paths that can deliver a message between the two nodes. At step 24, an offset which can be used to deliver a message s in causal order is created. In the present example, an offset matrix O of Table 4 is created by combining the matrixes P and G. The matrix O shows the offsets that any receiver node R of a message s can add to the time-stamp $t_h$ coming from the third node H. The values $o_{H,S}$ are calculated by using equation (3') and are independent of the receiver node R. Therefore, having only positive elements in matrix P that are greater than the corresponding clock skew between two nodes, none of the entries in matrix O of Table 4 is less than zero.

TABLE 3

Shortest message latency matrix P

| Sender | Receiver | | | | |
|---|---|---|---|---|---|
| | A | B | C | D | E |
| A | 0 | 16 | 24 | 20 | 12 |
| B | 15 | 0 | 8 | 8 | 18 |
| C | 23 | 8 | 0 | 10 | 20 |
| D | 22 | 9 | 11 | 0 | 10 |
| E | 12 | 18 | 24 | 13 | 0 |

TABLE 4

Time-stamp offset matrix O

| Sender | Receiver | | | | |
|---|---|---|---|---|---|
| | A | B | C | D | E |
| A | 0 | 15 | 23 | 19 | 11 |
| B | 14 | 0 | 7 | 7 | 17 |
| C | 22 | 7 | 0 | 9 | 19 |
| D | 21 | 8 | 10 | 0 | 9 |
| E | 11 | 17 | 23 | 12 | 0 |

Figure 3:
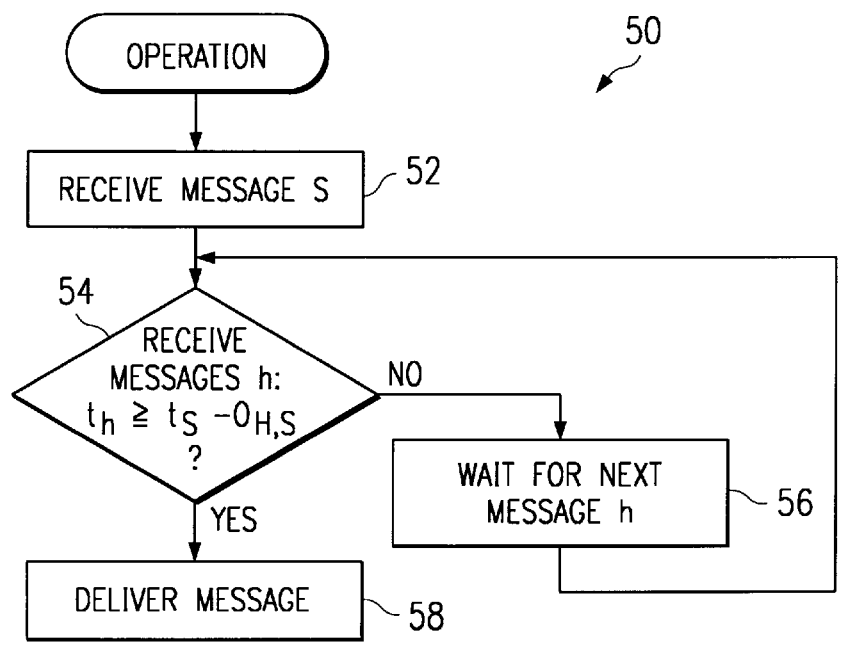
FIG. 3 is a flowchart illustrating a routine used by a node of FIG. 1 to assure a causally ordered response from a received message.

Referring to FIG. 3, once the distributed network 10 has been initialized and the above matrices have been created, an operation method 50 may be implemented. At step 52, the node R receives the message s with the time stamp $t_s$ from node S. At step 54, node R checks that it has received message h with time stamps $t_h \geq t_s - o_{H,S}$. A message h confirming that no third node H can affect the causal order of the message s, can only be created at least $o_{TS}$ milliseconds before the message s was sent.

In the present example, the times $f_{H,R} - o_{H,S}$ for all combinations of nodes R, S, and H are shown in the 3-dimensional Table 5. All numbers within a table entry give the arrival time of messages relative to the creation of a message s. Positive numbers mean that the message h will arrive after the message s was created and negative numbers mean that the message h arrived before the message s was created. The sender node S specifies the row, the receiver node R the column, and the third node H which number in the sequence (e.g., the third number in column B, row A refers to a constellation in which B receives a message from A and needs a time-stamp $t_C \geq t_a$ from node C). The $R^{th}$ number of all entries of the $R^{th}$ row denotes the delivery time for message s to itself. It is always equal to channel latency $f_{S,R}$ since the diagonal elements of the offset matrix O are zero (S=H$\Rightarrow o_{H,S}=0$).

Table 5: Arrival time of messages h compared to the creation time of message s for each node A, B, C, D, E.

TABLE 5

Arrival time of messages h compared to the creation time of message s for each node A, B, C, D, E.

| Sender | Receiver | | | | |
|---|---|---|---|---|---|
|  | A | B | C | D | E |
| A | 0, 1, +∞, 1, 1 | 16, −14, −14, −12, 7 | +∞, −6, −22, −10, +∞ | 20, −6, −12, −21, 2 | 12, 4, +∞, −11, −11 |
| B | −15, 15, +∞, 14, −5 | 1, 0, 1, 1, 1 | +∞, 8, −7, 3, +∞ | 5, 8, 3, −8, −4 | −3, 18, +∞, 2, −17 |
| C | −23, 8, +∞, 12, −11 | −7, −7, 8, −1, −5 | +∞, 1, 0, 1, +∞ | −3, 1, 10, −10, −10 | −11, 11, +∞, 0, −23 |
| D | −19, 8, +∞, 22, 0 | −3, −7, −1, 9, 6 | +∞, 1, −9, 11, +∞ | 1, 1, 1, 0, 1 | −7, 11, +∞, 10, −12 |
| E | −11, −2, +∞, 13, 12 | 5, −17, −11, 0, 18 | +∞, −9, −19, 2, +∞ | 9, −9, −9, −9, 13 | 1, 1, +∞, 1, 0 |

In the present example, the third number of all entries in column A equals +∞. This is also true for the first and fifth numbers in column C and the third numbers in column E. This is caused by the missing links between nodes A and C and nodes C and E. It is understood that a receiver node R will never get a message from a third node H with which it is not connected. Therefore, the worst case number +∞ can be replaced by a best case number −∞. However, the case in which node H equals node S describes the delivery of the message s itself. Therefore the $S_{th}$ number of all entries of row S keeps the value +∞. Furthermore, the first number in row A, column C, the third number in row C, column A, the third number in row C, column E, and the fifth number in row E, column C also keeps the value +∞.

A total delay for each node must then be determined. The total delay is the time the receiving node R must wait for causal ordering. In the present example, a total delay matrix K of Table 6, below, shows the receive time of the last message h that is required for causal ordering. It is derived from Table 5 by choosing the maximum number of each entry after replacing the +∞ values with −∞ values, as directed above. For most entries, the times are identical to the channel latencies (matrix F, Table 1). In cases where the message latency of a path over a third node is equal to that of a direct path (e.g., $f_{DA}=f_{D,E}+f_{E,A}$ and $f_{B,E}=f_{B,D}+f_{D,E}$), the delivery time equals the channel latency plus the clock skew (E sends to A, D send to E). In these cases the receiver must hold the message s for 1 ms in the buffer before delivery.

TABLE 6

Total delay matrix K for message delivery.

| Sender | Receiver | | | | |
|---|---|---|---|---|---|
|  | A | B | C | D | E |
| A | 1 | 16 | +∞ | 20 | 12 |
| B | 15 | 1 | 8 | 8 | 18 |
| C | +∞ | 8 | 1 | 10 | +∞ |
| D | 22 | 9 | 11 | 1 | 11 |
| E | 13 | 18 | +∞ | 13 | 1 |

Although a node can deliver its own message immediately after having created it, the table indicates a delay of 1 ms. This is caused by the fact that $o_{H,S}=f_{H,R}-g_{H,R}$ and if R=S, then $f_{H,R}-o_{H,S}=g_{H,R}$. The clock skew is incorporated into the offset to deal with the worst case. In reality, the clock skew can be neglected because it affects the channel latency in exactly the same way than it affects the offset. Subtracting one from the other, the clock skew drops out. Therefore, all the diagonal elements ($k_{ij}$ where i=j) of Table 6 can be replaced with zeros.

If at step 54 a determination can not be made that the messages h from all the other connected nodes has been received such that $t_h \geq t_s - o_{H,S}$, execution proceeds to step 56. At step 56, the node R holds the message s, execution returns to step 54, and node R waits for the next message h. If, however, $t_h \geq t_s - o_{H,S}$, execution proceeds to step 58 where node R delivers message s. Causal ordering of message s is thus guaranteed.

Although illustrative embodiments of the invention have been shown and described, other modifications, changes, and substitutions are intended in the foregoing disclosure. Accordingly, it is appropriate that the appended claims be construed broadly and in a manner consistent with the scope of the invention.

What is claimed is:

1. A causally ordered network comprising:
   three nodes;
   a path between the first and second nodes;
   a path between the third and second nodes;
   a path between third and first nodes with an associated minimum latency f3,1;
   means for producing a response by the second node causally ordered from a message sent by the first node and having a time stamp t1 as soon as the second node receives a message from the third node having a time stamp t3 such that:

$$t3 \geq t1 - f3,1.$$

2. The network of claim 1 wherein each of the three nodes includes a clock having a maximum skew less than or approximate to one-tenth of the latency f3,1.

3. The network of claim 2 wherein the clocks are synchronized.

4. The network of claim 2 wherein the latency f3,1 is adjusted to account for the maximum clock skew.

5. The network of claim 1 wherein each of the paths is a directed path.

6. The network of claim 1 wherein the path between the first and second nodes is routed through a fourth node.

7. A method for initiating a causally ordered response to a message received by a first node from a second node, both nodes being part of a distributed network, the method comprising the steps of:

synchronizing the first and second nodes;

determining an offset time f3,2 from a message latency of a third node of the distributed network to the second node;

retrieving a message start time ts when the message was sent by the second node; and initiating the causally ordered response after receiving a message start time t3 from the third node such that t3≧ts−f3,2.

8. The method of claim 7 further comprising:

determining an offset time f4,2 from a message latency of a fourth node of the distributed network to the second node;

initiating the causally ordered response also after receiving a message start time t4 from the fourth node such that t4≧ts−f4,2.

9. The method of claim 7 wherein the first and second nodes each have a clock synchronized to have an offset less than or approximate to one-tenth of the delay time.

10. The method of claim 7 wherein the nodes are synchronized.

11. The method of claim 8 wherein the delay time is adjusted to account for the clock offset.

12. A system for initiating a causally ordered response to a message received by a first node from a second node, both nodes being part of a distributed network, the system comprising:

means for synchronizing the first and second nodes;

means for determining an offset time f3,2 from a message latency of a third node of the distributed network to the second node;

means for retrieving a message start time ts when the message was sent by the second node; and means for initiating the causally ordered response after receiving a message start time t3 from the third node such that t3≧ts−f3,2.

13. The system of claim 12 further comprising means for determining an offset time f4,2 from a message latency of a fourth node of the distributed network to the second node;

wherein the means for initiating the causally ordered response initiates the response also after receiving a message start time t4 from the fourth node such that t4≧ts−f4,2.

14. The system of claim 13 wherein the first and second nodes each have a synchronized clock.

15. The system of claim 12 further comprising means for adjusting the delay time by the clock offset.

* * * * *